(12) United States Patent
Takaki et al.

(10) Patent No.: US 11,990,654 B2
(45) Date of Patent: May 21, 2024

(54) FUEL CELL SYSTEM, WORKING MACHINE INCLUDING THE SAME, AND METHOD OF CONTROLLING FUEL CELL SYSTEM

(71) Applicant: KUBOTA CORPORATION, Osaka (JP)

(72) Inventors: Takahiro Takaki, Osaka (JP); Yukifumi Yamanaka, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 17/840,115

(22) Filed: Jun. 14, 2022

(65) Prior Publication Data

US 2023/0016974 A1 Jan. 19, 2023

(30) Foreign Application Priority Data

Jul. 15, 2021 (JP) ................... 2021-117178

(51) Int. Cl.
| | |
|---|---|
| *H01M 8/04* | (2016.01) |
| *H01M 8/0267* | (2016.01) |
| *H01M 8/04007* | (2016.01) |
| *H01M 8/04014* | (2016.01) |
| *H01M 8/04029* | (2016.01) |
| *H01M 8/0438* | (2016.01) |
| *H01M 8/04701* | (2016.01) |

(52) U.S. Cl.
CPC ..... *H01M 8/04723* (2013.01); *H01M 8/0267* (2013.01); *H01M 8/04014* (2013.01); *H01M 8/04029* (2013.01); *H01M 8/04067* (2013.01); *H01M 8/04388* (2013.01)

(58) Field of Classification Search
CPC .......... H01M 8/04723; H01M 8/0267; H01M 8/04014; H01M 8/04029; H01M 8/04067
See application file for complete search history.

(56) References Cited

U.S. PATENT DOCUMENTS 6,964,821 B2 11/2005 Hirakata
2020/0091529 A1* 3/2020 Yamanishi ........ H01M 8/04425

FOREIGN PATENT DOCUMENTS

| EP | 1826051 | 8/2007 |
|---|---|---|
| JP | 2005-102458 A | 4/2005 |
| JP | 4134679 | 8/2008 |

OTHER PUBLICATIONS

European Search Report issued with respect to European Patent Application No. 22179427.4, dated Dec. 2, 2022.

* cited by examiner

*Primary Examiner* — Olatunji A Godo
(74) *Attorney, Agent, or Firm* — Greenblum & Bernstein, P.L.C.

(57) ABSTRACT

A fuel cell system includes a hydrogen tank to store hydrogen, a fuel cell to receive hydrogen gas from the hydrogen tank to generate electricity, a temperature controller to adjust a temperature inside the hydrogen tank, and a control unit to control the temperature controller based on the amount of hydrogen remaining in the hydrogen tank, the control unit being configured to increase the temperature inside the hydrogen tank when the amount of the remaining hydrogen is equal to or less than a first predetermined value.

14 Claims, 7 Drawing Sheets

FUEL CELL SYSTEM, WORKING MACHINE INCLUDING THE SAME, AND METHOD OF CONTROLLING FUEL CELL SYSTEM

CROSS-REFERENCE TO RELATED APPLICATION

This application claims the benefit of priority to Japanese Patent Application No. 2021-117178 filed on Jul. 15, 2021. The entire contents of this application are hereby incorporated herein by reference.

BACKGROUND OF THE INVENTION

1. Field of the Invention

The present invention relates to a fuel cell system, a working machine such as a tractor or a backhoe including a fuel cell system, and a method of controlling a fuel cell system.

2. Description of the Related Art

In recent years, hydrogen fuel gas as fuel for automobiles has earned attention as a clean energy source for prevention of air pollution. Under such circumstances, as disclosed in Japanese Unexamined Patent Application Publication No. 2005-102458 (Patent Literature 1), development has been done on a fuel cell vehicle (FCV) equipped with a fuel cell which generates electricity through an electrochemical reaction between a fuel gas such as hydrogen gas and an oxidant gas such as air and using the electricity generated by the fuel cell as a drive source for front wheels and rear wheels. Such a fuel cell vehicle is equipped with a tank for storage of fuel gas such as hydrogen gas to be supplied to the fuel cell, such as a hydrogen storage alloy tank or a high pressure tank.

In terms of prevention of air pollution as such, the technical trend of using a fuel cell as a drive source is not only among automobiles and, for example, research and development have been done to apply a fuel cell also to various working machines including agricultural machines such as a rice transplanter and a combine and construction machines such as a backhoe, a compact track loader, and a skid-steer loader.

BRIEF SUMMARY OF THE INVENTION

However, with regard to a working machine (industrial machine) which can have attached thereto a working device or which includes a working device, although most of the drive source for an automobile is used only for traveling, the drive source for the working machine is used not only for traveling but also for driving of the working device. Therefore, in the case of a working machine, there may be cases in which the electric power load increases abruptly regardless of the position of an accelerator for traveling. Therefore, in a working machine including a fuel cell as a drive source, it is impossible to increase the amount of fuel gas such as hydrogen gas supplied to the fuel cell in quick response to a load, and, if the flow rate of the hydrogen gas released from a metal hydride (MH) tank increases abruptly, the pressure inside the MH tank drops abruptly and the responsiveness of output power of the fuel cell decreases.

A tank to store hydrogen gas for supply to a fuel cell on such a working machine is generally an MH tank using a hydrogen storage alloy (also called an alloy for hydrogen storage, an alloy for hydrogen sorption, a hydrogen absorbing alloy, a hydrogen occlusion alloy, etc.) which can store hydrogen even at 1.0 MPa or lower, in view of an improvement in safety and compliance with the High Pressure Gas Safety Act. Therefore, when the amount of hydrogen stored in MH decreases, hydrogen gas is not released anymore at constant temperature without further reducing pressure. Furthermore, the fuel cell requires hydrogen gas at a certain pressure or higher to generate electricity. Therefore, since hydrogen gas cannot be released by further reducing the pressure of hydrogen gas at constant temperature, it is necessary to refill the MH tank with additional amounts of hydrogen although a lot of hydrogen still remains stored in MH.

Embodiments of the present invention provide fuel cell systems, working machines including a fuel cell system, and methods of controlling a fuel cell system each of which makes it possible, in a working machine including a fuel cell, even if the fuel cell is subjected to a sudden electric power load, to change the amount of supply of hydrogen gas to the fuel cell in quick response to the sudden load without causing a decrease in responsiveness of output power of the fuel cell, and also to reduce the amount of hydrogen left unused in the hydrogen storage alloy in the MH tank.

A fuel cell system according to an aspect of the present invention includes a hydrogen tank to store hydrogen, a fuel cell to receive hydrogen gas from the hydrogen tank to generate electricity, a temperature controller to adjust a temperature inside the hydrogen tank, and a control unit to control the temperature controller based on the amount of hydrogen remaining in the hydrogen tank, the control unit being configured to increase the temperature inside the hydrogen tank when the amount of the remaining hydrogen is equal to or less than a first predetermined value.

The fuel cell system may further include a first circulating water supply passage for circulation of first circulating water to adjust the temperature inside the hydrogen tank. The temperature controller may include a heater to increase a temperature of the first circulating water, the first circulating water supply passage being provided with the heater. The control unit may be configured to, when the amount of the remaining hydrogen is equal to or less than the first predetermined value, start energizing the heater to increase the temperature inside the hydrogen tank.

The temperature controller may further include a first radiator to reduce the temperature of the first circulating water, the first circulating water supply passage being provided with the first radiator, and a first blower to pass cooling air across the first radiator.

The fuel cell system may further include a second circulating water supply passage for circulation of second circulating water to cool the fuel cell. The first circulating water supply passage may branch from the second circulating water supply passage.

The fuel cell system may further include a second radiator to reduce a temperature of the second circulating water, the second circulating water supply passage being provided with the second radiator, and a second blower to pass cooling air across the second radiator.

The control unit may calculate a target temperature from the calculated amount of the remaining hydrogen based on a characteristics map of temperature versus the amount of the remaining hydrogen, and control the heater to control an actual temperature of the first circulating water flowing in the first circulating water supply passage at the target temperature thus calculated.

The fuel cell system may further include a hydrogen gas supply passage for supply of the hydrogen gas from the hydrogen tank to the fuel cell. The hydrogen gas supply passage may be provided with a pressure sensor to detect a pressure of the hydrogen gas in the hydrogen tank.

The fuel cell system may further include a flow control valve to adjust a flow rate of the first circulating water flowing in the first circulating water supply passage. The control unit may determine a target flow rate of the first circulating water flowing in the first circulating water supply passage based on a difference between a second predetermined value and the pressure of the hydrogen gas detected by the pressure sensor, and control the flow control valve to control the flow rate of the first circulating water flowing in the first circulating water supply passage at the target flow rate thus determined.

The fuel cell system may further include a pulse width modulation (PWM) pump to adjust a flow rate of the first circulating water flowing in the first circulating water supply passage. The control unit may determine a target flow rate of the first circulating water flowing in the first circulating water supply passage based on a difference between a second predetermined value and the pressure of the hydrogen gas detected by the pressure sensor, and control the PWM pump to control the flow rate of the first circulating water flowing in the water supply passage at the target flow rate thus determined.

The second predetermined value may be between a minimum pressure of the hydrogen gas for the fuel cell to operate and 1.0 MPa.

The minimum pressure of the hydrogen gas for the fuel cell to operate may be 0.85 MPa.

The control unit may stop the fuel cell from generating electricity when the pressure of the hydrogen gas detected by the pressure sensor is less than a minimum pressure of the hydrogen gas for the fuel cell to operate.

The hydrogen tank may include a hydrogen storage alloy, and may be configured to allow the hydrogen gas to be released from the hydrogen storage alloy and supply the hydrogen gas to the fuel cell.

The control unit may calculate the amount of the remaining hydrogen based on a flow rate of the hydrogen gas or a value of electric current from the fuel cell.

A working machine includes the above-described fuel cell system.

A method of controlling a fuel cell system is a method of controlling a fuel cell system which includes a hydrogen tank to store hydrogen and a fuel cell to receive hydrogen gas from the hydrogen tank to generate electricity, the method including a) circulating first circulating water through a first circulating water supply passage, the first circulating water being water to adjust a temperature inside the hydrogen tank, b) increasing a temperature of the first circulating water flowing in the first circulating water supply passage, and c) increasing the temperature of the first circulating water based on the amount of the hydrogen remaining in the hydrogen tank, wherein the step c) includes calculating the amount of the hydrogen remaining in the hydrogen tank and increasing the temperature of the first circulating water when the amount of the remaining hydrogen thus calculated is equal to or less than a first predetermined value.

The method may be arranged such that the amount of the remaining hydrogen is calculated based on a flow rate of the hydrogen gas or a value of electric current from the fuel cell.

The method may be arranged such that a target temperature is calculated, based on a characteristics map of temperature versus the amount of the remaining hydrogen, from the amount of the remaining hydrogen thus calculated, and the temperature of the first circulating water flowing in the first circulating water supply passage is increased to the target temperature thus calculated.

The method may further include d) adjusting a flow rate of the first circulating water flowing in the first circulating water supply passage. The method may further include e) detecting a pressure of the hydrogen gas in the hydrogen tank. The method may further include f) determining a target flow rate of the first circulating water flowing in the first circulating water supply passage based on a difference between a second predetermined value and the pressure of the hydrogen gas detected by the pressure sensor, and controlling the flow rate of the first circulating water flowing in the first circulating water supply passage at the target flow rate thus determined.

The second predetermined value may be between a minimum pressure of the hydrogen gas for the fuel cell to operate and 1.0 MPa.

The minimum pressure of the hydrogen gas for the fuel cell to operate may be 0.85 MPa.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

(a) of FIG. 5A is a time series waveform chart showing how the flow rate of hydrogen gas flowing from hydrogen tanks through a hydrogen gas supply passage to a fuel cell changes versus time. (b) of FIG. 5A is a time series waveform chart showing how the pressure of hydrogen gas in the hydrogen tank(s) in FIG. 2 changes versus time, and is on the same time axis as (a) of FIG. 5A. (c) of FIG. 5A is a time series waveform chart showing how the flow rate of first circulating water (hot or warm water) flowing in the hydrogen tanks in FIG. 1 changes versus time, and is on the same time axis as (a) of FIG. 5A. (d) of FIG. 5A is a time series waveform chart showing how the temperature of first circulating water (hot or warm water) changes versus time, and is on the same time axis as (a) of FIG. 5A. (e) of FIG. 5A is a time series waveform chart showing how the operating state of the fuel cell in FIG. 2 changes versus time, and is on the same time axis as (a) of FIG. 5A. (f) of FIG. 5A is a time series waveform chart showing how the amount of hydrogen remaining in the hydrogen tank(s) in FIG. 2 changes versus time, and is on the same time axis as (a) of FIG. 5A.

(a) of FIG. 5B is a time series waveform chart showing how the flow rate of hydrogen gas flowing from the hydrogen tanks through the hydrogen gas supply passage to the fuel cell changes versus time. (b) of FIG. 5B is a time series waveform chart showing how the pressure of hydrogen gas in the hydrogen tank(s) in FIG. 2 changes versus time, and is on the same time axis as (a) of FIG. 5B. (c) of FIG. 5B is a time series waveform chart showing how the flow rate of first circulating water (hot or warm water) flowing in the hydrogen tanks in FIG. 1 changes versus time, and is on the same time axis as (a) of FIG. 5B. (d) of FIG. 5B is a time series waveform chart showing how the temperature of first circulating water (hot or warm water) changes versus time, and is on the same time axis as (a) of FIG. 5B. (e) of FIG. 5B is a time series waveform chart showing how the operating state of the fuel cell in FIG. 2 changes versus time, and is on the same time axis as (a) of FIG. 5B. (f) of FIG. 5B is a time series waveform chart showing how the amount of hydrogen remaining in the hydrogen tank(s) in FIG. 2 changes versus time, and is on the same time axis as (a) of FIG. 5B.

DETAILED DESCRIPTION OF THE EMBODIMENTS

The preferred embodiments will now be described with reference to the accompanying drawings, wherein like reference numerals designate corresponding or identical elements throughout the various drawings. The drawings are to be viewed in an orientation in which the reference numerals are viewed correctly.

Figure 1:
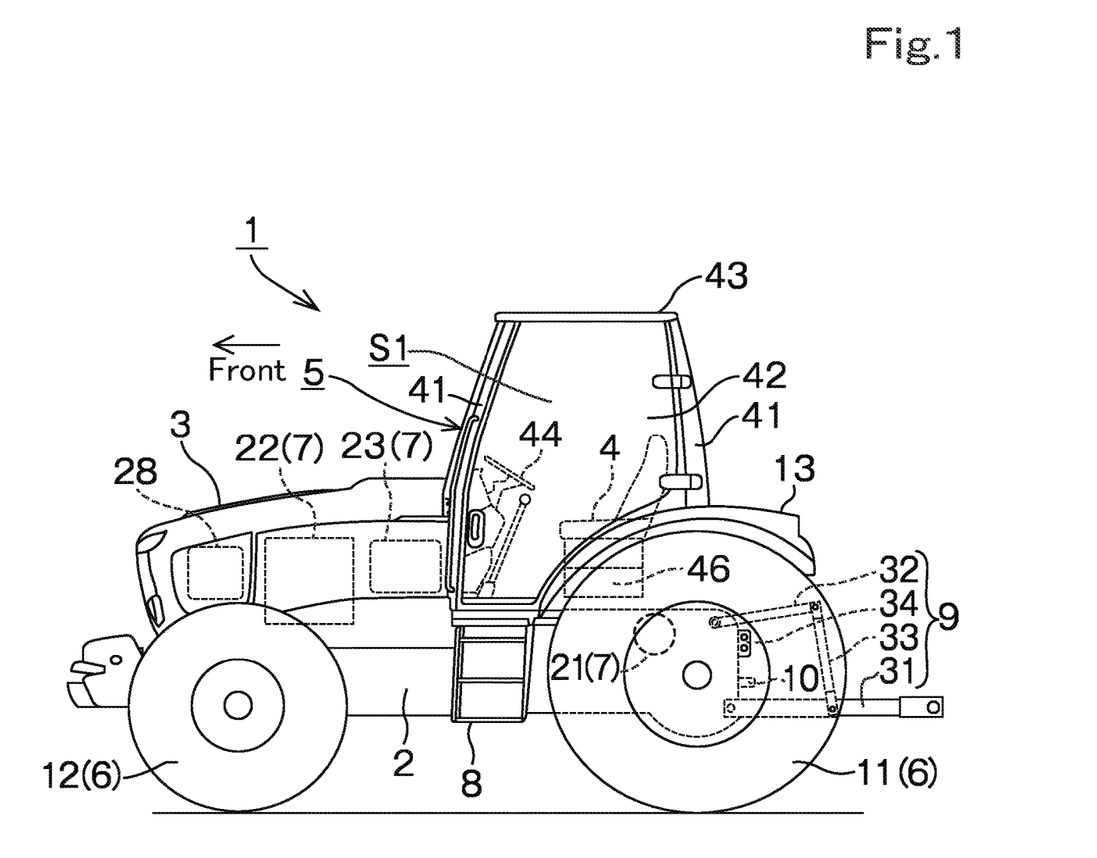
FIG. 1 is a side view schematically illustrating an agricultural tractor according to an embodiment.
Figure 2:
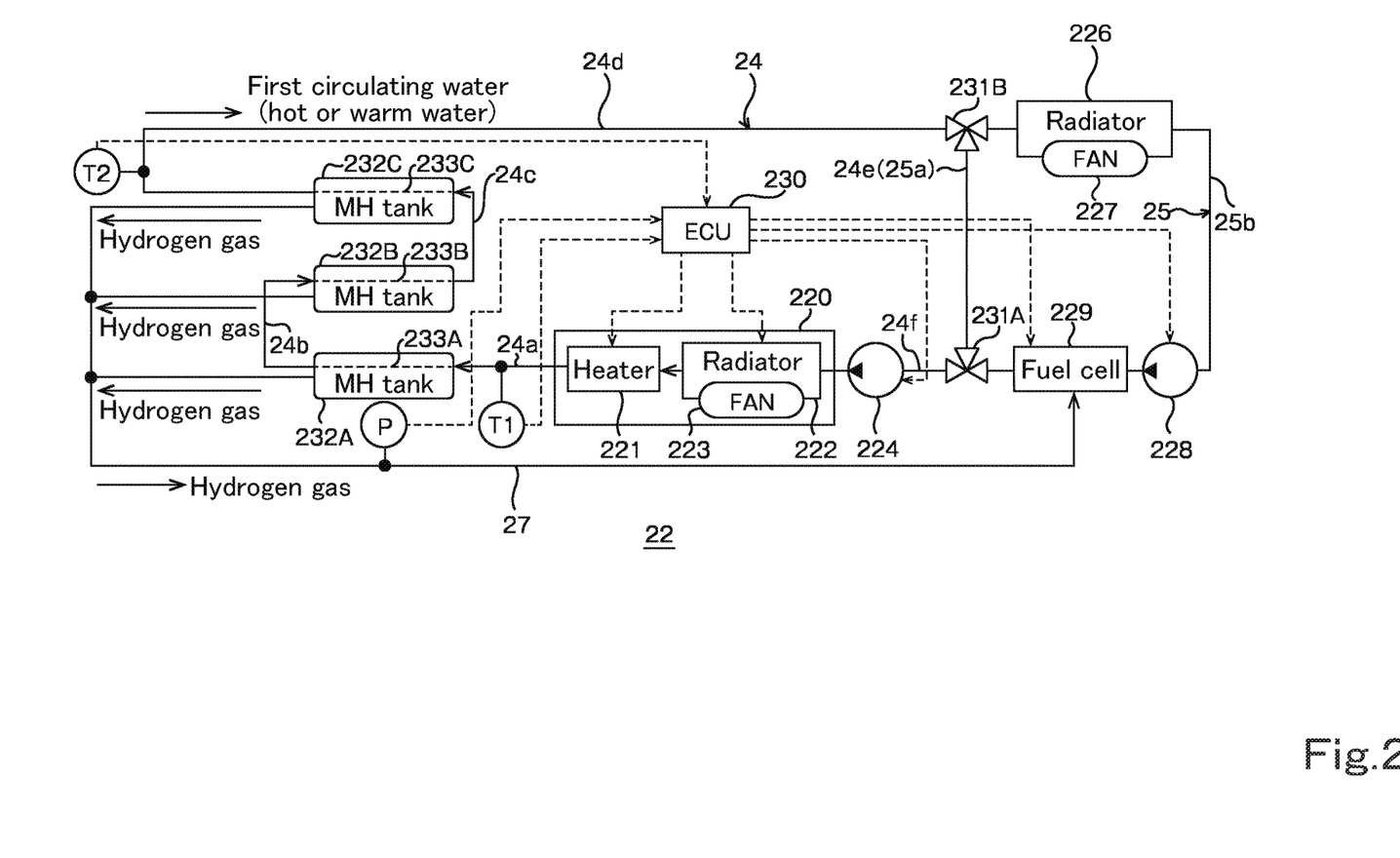
FIG. 2 is a block diagram schematically illustrating a configuration of a fuel cell system in FIG. 1.
Figure 3:
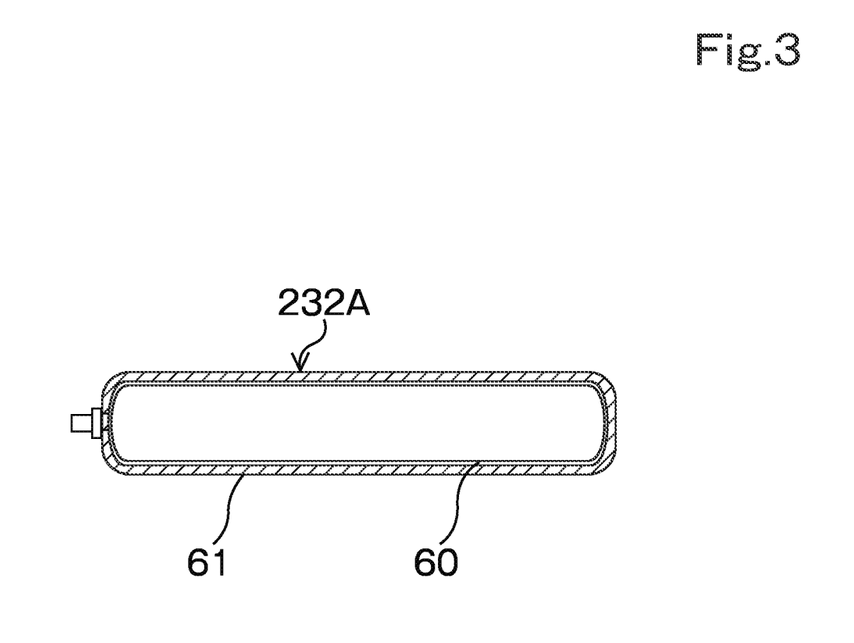
FIG. 3 is a longitudinal cross-sectional view of a hydrogen tank in FIG. 2.

FIGS. 1 to 3 illustrate a working machine 1 and its components according to an embodiment. In the present embodiment, the working machine 1 is a tractor. In the following description, the direction of travel of the tractor 1 (arrow "front") is the "forward" direction of the tractor 1 and of each component for tractors, the opposite direction to the direction of travel of the tractor 1 is the "rearward" direction, and leftward and rightward directions from a user seated on the tractor 1 are "lateral" directions of the tractor 1 and each component for tractors. A horizontal direction orthogonal to a front-rear direction of a vehicle body of the tractor 1 is a width direction of the tractor 1. The tractor 1 includes a fuel cell 229 (see FIG. 2) which generates electricity through an electrochemical reaction between a fuel gas and an oxidant gas, and is configured to use the electricity generated by the fuel cell 229 as a power source. Note that, although the present embodiment is discussed using an agricultural tractor as a working machine, the present invention is not limited as such. The present invention can be applied to various working machines including agricultural machines such as a rice transplanter and a combine and construction machines such as a backhoe, a compact track loader, and a skid-steer loader.

FIG. 1 is a side view schematically illustrating the tractor 1 according to the present embodiment. FIG. 1 shows the left side of the entire tractor 1. The tractor 1 in FIG. 1 includes a vehicle body 2 with its longitudinal dimension in a front-rear direction, a hood 3 provided on a front portion of the vehicle body 2, a cabin 5 provided on a rear portion of the vehicle body 2 and containing an operator's seat 4 for an operator (user), a wheeled traveling device 6 which supports the vehicle body 2 such that the vehicle body 2 can travel, a driving device 7 to drive the traveling device 6, a three-point linkage 9 provided at the rear of the vehicle body 2, and a power take-off shaft (PTO shaft) 10 which transmits power from the driving device 7.

The traveling device 6 in FIG. 1 includes a pair of left and right rear wheels 11 and a pair of left and right front wheels 12, and upper portions of the rear wheels 11 are covered with fenders 13. It is noted here that the traveling device 6 is of a four-wheel-drive type that can be switched between two wheel drive and four wheel drive modes. The traveling device 6 is configured to be switched between a two-wheel-drive mode in which only the rear wheels 11 are used for driving and a four-wheel-drive mode in which the rear wheels 11 and the front wheels 12 are used for driving. Note that the present invention can also be applied to two-wheel-drive tractors in which only rear wheels are driven and tractors including a crawler traveling device.

The driving device 7 in FIG. 1 includes an alternating current drive motor (electric motor) 21 which is provided near the rear wheels 11 and which drives wheels or crawlers of the traveling device 6, a fuel cell system 22 which is provided inside the hood 3 and which supplies electricity to the drive motor 21, and a controller 23 which is provided inside the hood 3 and which controls the supply of electricity from the fuel cell system 22 to the drive motor 21. The driving device 7 may include a hydrogen gas sensor to sense hydrogen gas. In such a case, a ventilation door may be provided on a ceiling 43 of the cabin 5 so that, when the hydrogen gas sensor senses hydrogen gas, the ventilation door is opened to enable communication between an interior space S1 of the cabin 5 and the outside.

It is noted here that the drive motor 21 has an output shaft connected indirectly via a transmission mechanism or directly to the axle of the rear wheels 11 and connected to the front wheels 12 via a 2WD-4WD switching mechanism so that the switching between the two-wheel-drive and four-wheel-drive modes can be achieved. In the fuel cell system 22, electricity is generated by allowing hydrogen gas supplied from hydrogen tanks 232A to 232C (may be referred to as hydrogen tanks 232) (described later) and air (oxygen) taken from the outside to react, and the electricity is supplied to the drive motor 21. The controller 23 has an inverter function. The controller 23 convers the DC electricity generated by the fuel cell system 22 into AC electricity and subject it to frequency control to control the rotation of the drive motor 21. A battery 28 to store an excess of electricity supplied from the fuel cell system 22 to the drive motor 21 may be provided inside the hood 3, and the controller 23 may be configured to control the rotation of the drive motor 21 using the electricity stored in the battery 28.

The three-point linkage 9 includes a pair of left and right lower links 31 supported on a lower rear portion of the vehicle body 2 such that the lower links 31 are pivotable up and down, a pair of left and right lift arms 32 which are supported on an upper rear portion of the vehicle body 2 such that the lift arms 32 are pivotable up and down and which are driven with hydraulic device(s), a pair of connecting links 33 which connect rear ends of the lift arms 32 and intermediate portions of the lower links 31 and which cause the lower links 31 to pivot as the lift arms 32 pivot, and a bracket 34 for attachment of an upper link. The rear ends of the pair of left and right lower links 31 and the upper link connected to the bracket 34 support any of various types of working devices such that the working device is movable up and down. The PTO shaft 10 has connected thereto an input of the working device via a drive shaft. The PTO shaft 10 is rotated by power transmitted from the drive motor 21. It is noted here that the working device is a cultivator for cultivation, a fertilizer spreader to spread fertilizer, an agricultural chemical spreader to spread agricultural chemicals, a harvester for harvesting, a mower for mowing grass or the like, a tedder for tedding grass or the like, a rake for raking grass or the like, a baler (roll baler) for baling grass or the like, and/or the like.

The cabin 5 in FIG. 1 includes four cabin frames (pillars) 41 extending upward from the four corners, transparent walls (without reference signs) which cover the front and rear faces, transparent entrance/exit doors 42 which cover the left and right faces, and the ceiling 43. It is noted here that a control 44 including a steering wheel and the like is provided in front of the operator's seat 4, and an air conditioner unit 46 to perform air conditioning in the interior space S1 of the cabin 5 is provided below the operator's seat 4. An entrance/exit step 8 on which the user steps when entering and exiting from the cabin 5 is provided below the cabin 5. The entrance/exit step 8 here is provided below each of the left and right entrance/exit doors 42.

FIG. 2 is a block diagram schematically illustrating a configuration of the fuel cell system 22 in FIG. 1. The fuel cell system 22 in FIG. 2 includes three hydrogen tanks 232A, 232B, and 232C which store hydrogen and which supply fuel hydrogen gas to a fuel cell 229, the fuel cell 229 to receive hydrogen gas from the hydrogen tanks 232A to 232C to generate electricity, a first circulating water supply passage 24 for circulation of first circulating water (hot or warm water) to adjust the temperature inside each of the hydrogen tanks 232A to 232C, a temperature controller 220 to adjust the temperature of the first circulating water (hot or warm water) (the first circulating water supply passage 24 is provided with the temperature controller 220), a control unit (ECU) 230 to control the temperature of the temperature controller 220 based on the amount of hydrogen remaining in the hydrogen tanks 232A to 232C, a hydrogen gas supply passage 27 for supply of hydrogen gas from each of the hydrogen tanks 232A to 232C to the fuel cell 229, and a second circulating water supply passage 25 for circulation of second circulating water (cooling water) to cool the fuel cell 229.

Specifically, the fuel cell system 22 may include the second circulating water supply passage 25 for circulation of the second circulating water (cooling water) to cool the fuel cell 229, and the first circulating water supply passage 24 may branch from the second circulating water supply passage 25. It is noted here that the temperature controller 220 may include a heater 221 such as a ceramic heater to increase the temperature of the first circulating water, a first radiator 222 to reduce the temperature of the first circulating water, and a first blower (FAN) 223 to pass cooling air across the first radiator 222.

The hydrogen gas supply passage 27 may be provided with a pressure sensor P to detect the pressure of hydrogen gas in the hydrogen tanks 232A to 232C. Note that, although an example case in which three hydrogen tanks are provided is discussed for convenience in the present embodiment, the present invention is not limited as such. For example, a configuration in which one hydrogen tank or a plurality (other than three) of hydrogen tanks is/are provided may be used. It is noted here that the plurality of hydrogen tanks may be connected in series or parallel to each other.

The first circulating water supply passage 24 in FIG. 2 includes a first flow passage 24a for passage of first circulating water from the temperature controller 220 through a pipe 233A in the hydrogen tank 232A, a second flow passage 24b via which the pipe 233A in the hydrogen tank 232A and a pipe 233B in the hydrogen tank 232B are in communication with each other, a third flow passage 24c via which the pipe 233B in the hydrogen tank 232B and a pipe 233C in the hydrogen tank 232C are in communication with each other, a fourth flow passage 24d through which first circulating water (hot or warm water) from the hydrogen tank 232C flows, a three-way valve 231B to select a flow passage into which the first circulating water (hot or warm water) flowing in the fourth flow passage 24d flows, a fifth flow passage 24e through which the first circulating water (hot or warm water) from the three-way valve 231B flows, a three-way valve 231A to select a flow passage into which the first circulating water (hot or warm water) flowing in the fifth flow passage 24e flows, and a sixth flow passage 24f through which the first circulating water (hot or warm water) flows back to the temperature controller 220 via the three-way valve 231A.

The first flow passage 24a is provided with a temperature sensor T1 to measure the temperature of first circulating water (hot or warm water) from the temperature controller 220 to the pipe 233A of the hydrogen tank 232A, and the fourth flow passage 24d is provided with a temperature sensor T2 to measure the temperature of first circulating water (hot or warm water) from the pipe 233C of the hydrogen tank 232C. The sixth flow passage 24f is provided with a pulse width modulation (PWM) pump 224 to control the flow rate of first circulating water (hot or warm water) flowing into the temperature controller 220 via the three-way valve 231A. With regard to the temperature of first circulating water (hot or warm water), a configuration in which temperature data from either the temperature sensor T1 or T2 is acquired may be used. Alternatively or additionally, a configuration in which the average data of both the temperature sensor T1 and the temperature sensor T2 is acquired may be used. The following configuration (not illustrated) may also be used: at least one of the hydrogen tanks 232A to 232C is provided with a temperature sensor to measure the temperature inside the hydrogen tank; and the control unit 230 acquires at least one temperature data and calculates the temperature of first circulating water (hot or warm water) using the temperature data.

The first circulating water supply passage 24 in FIG. 2 is, for example, formed of pipe(s) so that first circulating water (hot or warm water) delivered from the PWM pump 224 circulates in a manner such that the first circulating water passes through the temperature controller 220, then the hydrogen tanks 232A to 232C, then the three-way valve 231B, and then the three-way valve 231A, through the flow passages 24a, 24b, 24c, 24d, 24e, and 24f and the pipes 233A to 233C in the hydrogen tanks, to return to the PWM pump 224. The first circulating water (hot or warm water) here serves as a heat transfer medium, and the first circulating water supply passage 24 achieves heating of the hydrogen tanks 232A, 232B, and 232C by circulation of the first circulating water (hot or warm water). Although the present embodiment is discussed using water as a heat transfer medium, the present invention is not limited as such. For example, a configuration in which antifreeze liquid containing ethylene glycol as the main component is used as a heat transfer medium may be used.

The second circulating water supply passage 25 in FIG. 2 includes the three-way valve 231A to select a flow passage into which second circulating water (cooling water) from the fuel cell 229 flows, a seventh flow passage 25a through which second circulating water whose passage has been selected by the three-way valve 231A flows, the three-way valve 231B to select a flow passage into which second circulating water flowing in the seventh flow passage 25a flows, a second radiator 226 to cool second circulating water from the three-way valve 231B, a second blower (FAN) 227 to pass cooling air across the second radiator 226, and an eighth flow passage 25b through which the second circulating water (cooling water) from the second radiator 226 flows back into the fuel cell 229.

Note that the same pipe(s) serves both as the fifth flow passage 24e of the first circulating water supply passage 24 and the seventh flow passage 25a of the second circulating water supply passage 25. The second radiator 226 dissipates heat from the second circulating water (cooling water), and the second blower 227 promotes the dissipation of heat by the second radiator 226. The eighth flow passage 25a is provided with a PWM pump 228 to control the flow rate of second circulating water (cooling water) flowing into the fuel cell 229. Specifically, the second circulating water supply passage 25 in FIG. 2 is, for example, formed of pipe(s) so that second circulating water (cooling water) delivered from the PWM pump 228 circulates in a manner such that the second circulating water (cooling water) passes through the fuel cell 229, then the three-way valve 231A, then the three-way valve 231B, and then the second radiator 226, through the seventh flow passage 25a and the eighth flow passage 25b, to return to the PWM pump 228. The second circulating water (cooling water) here serves as a heat transfer medium, and the second circulating water supply passage 25 achieves cooling of the fuel cell 229 by circulation of the second circulating water (cooling water).

The control unit 230 in FIG. 2 controls the temperature controller 220 based on the amount of hydrogen remaining in the hydrogen tanks 232A to 232C. The control unit 230 controls the temperature controller 220 such that, when the amount of the hydrogen remaining in the hydrogen tanks 232A to 232C is equal to or less than a first predetermined value, the temperature controller 220 starts energizing the heater 221 to increase the temperature inside the hydrogen tanks 232A to 232C. The control unit 230 monitors the pressure inside the hydrogen tanks 232A to 232C, and controls the pressure inside the hydrogen tanks 232A to 232C so that the pressure does not exceed 1.0 MPa due to an increase in temperature of the hydrogen tanks because of, for example, an increase in ambient temperature in summer. It is noted here that "1.0 MPa" is based on the High Pressure Gas Safety Act stating that the filling pressure of a hydrogen tank must be 1.0 MPa or less. Note that a second predetermined value (described later) of the pressure of hydrogen gas in the hydrogen tanks is between a minimum pressure PC of hydrogen gas for the fuel cell 229 to operate (such a pressure may be hereinafter referred to minimum operating pressure) and 1.0 MPa. In the present embodiment, the minimum pressure PC of hydrogen gas for the fuel cell 229 to operate is set to, for example, 0.85 MPa.

Specifically, the control unit 230 acquires the value of the flow rate of hydrogen gas supplied to the fuel cell 229 or the value of electric current from the fuel cell 229 to a load, calculates the amount of hydrogen remaining in the hydrogen tanks 232A to 232C based on the acquired value of the flow rate of hydrogen gas or the value of electric current from the fuel cell 229 to the load, and calculates a target temperature from the amount of remaining hydrogen based on a characteristics map of temperature versus the amount of remaining hydrogen. The control unit 230 then controls the heater 221 and the first radiator 222 to control the actual temperature of first circulating water flowing in the first circulating water supply passage 24 at the calculated target temperature. The hydrogen gas supply passage 27 is provided with a flowmeter (not illustrated) to measure the flow rate of hydrogen gas, and the control unit 230 may be configured to acquire data of the value of the flow rate of hydrogen gas from the flowmeter.

The control unit 230 in FIG. 2 has the function of detecting the value of electric current outputted from the fuel cell 229 to a load and the function of detecting the flow rate of hydrogen gas inputted from the hydrogen tanks 232A to 232C into the fuel cell 229.

The characteristics map shows relationships between the amount of hydrogen remaining in the hydrogen tanks 232A to 232C, the temperature of first circulating water (hot or warm water), and the pressure of hydrogen gas in the hydrogen tanks 232A to 232C. The control unit 230 calculates the target temperature of first circulating water (hot or warm water) from the amount of remaining hydrogen and the pressure of hydrogen gas based on the characteristics map, and controls the energization of the heater 221 and the operation of the first radiator 222 to control the actual temperature of the first circulating water (hot or warm water) at the target temperature. Specifically, the characteristics map shows a relationship between the total value of electric current outputted from the fuel cell 229 to an electric load (not illustrated) and the amount of consumed hydrogen, and makes it possible to derive the amount of consumed hydrogen by calculating the total value of electric current outputted from the fuel cell 229.

The configuration makes it possible, in the tractor 1 (working machine) including the fuel cell 229, to increase the flow rate of first circulating water once the pressure of hydrogen gas in the hydrogen tank(s) has reached a predetermined pressure higher than the minimum pressure PC of hydrogen gas for the fuel cell 229 to operate, while preventing a rapid drop of the pressure of hydrogen gas inside the hydrogen tank(s) to the minimum operating pressure PC that would result from a rapid increase in electric power load on the fuel cell 229. Thus, it is possible to increase the flow rate of the first circulating water (hot or warm water) to increase the amount of supplied hydrogen gas once the pressure of hydrogen gas inside the hydrogen tank(s) has reached the predetermined pressure higher than the minimum operating pressure PC of the fuel cell 229, and therefore it is possible to increase the amount of hydrogen gas supplied to the fuel cell 229 in quick response to an increase in imposed electric power load.

The control unit 230 in FIG. 2 determines a target flow rate of first circulating water flowing in the first circulating water supply passage 24 based on a difference between a second predetermined value and the pressure of hydrogen gas detected by the pressure sensor P, and controls the PWM pump 224 to control the flow rate of the first circulating water flowing in the first circulating water supply passage 24 at the determined target flow rate.

The control unit 230 stops the fuel cell 229 from generating electricity when the pressure of hydrogen gas detected by the pressure sensor P is less than the minimum pressure PC (0.85 MPa in the present embodiment) of hydrogen gas for the fuel cell to operate.

FIG. 3 is a longitudinal cross-sectional view of the hydrogen tank 232A in FIG. 2. The hydrogen tank 232A in FIG. 3 contains a hydrogen storage material, and includes a liner 60 which defines an interior space in which hydrogen gas is contained and a carbon fiber reinforced polymer (CFRP) layer 61 coated on the outer surface of the liner 60. The liner 60 is made of, for example, a hydrogen storage alloy as a hydrogen storage material. The liner 60 is allowed to absorb (store) hydrogen gas by increasing pressure or by cooling, and is allowed to release hydrogen gas by reducing pressure or by heating. Note that each of the hydrogen tanks 232B and 232C in FIG. 2 has the same structure as the hydrogen tank 232A. That is, each of the hydrogen tanks 232A to 232C includes a hydrogen storage alloy, and allows hydrogen gas to be released from the hydrogen storage alloy and supplies the hydrogen gas to the fuel cell 229. Each of the hydrogen tanks 232A to 232C is a low-pressure hydrogen tank which is capable of absorbing (storing) 1000 times or more of its volume of hydrogen gas.

Figure 4:
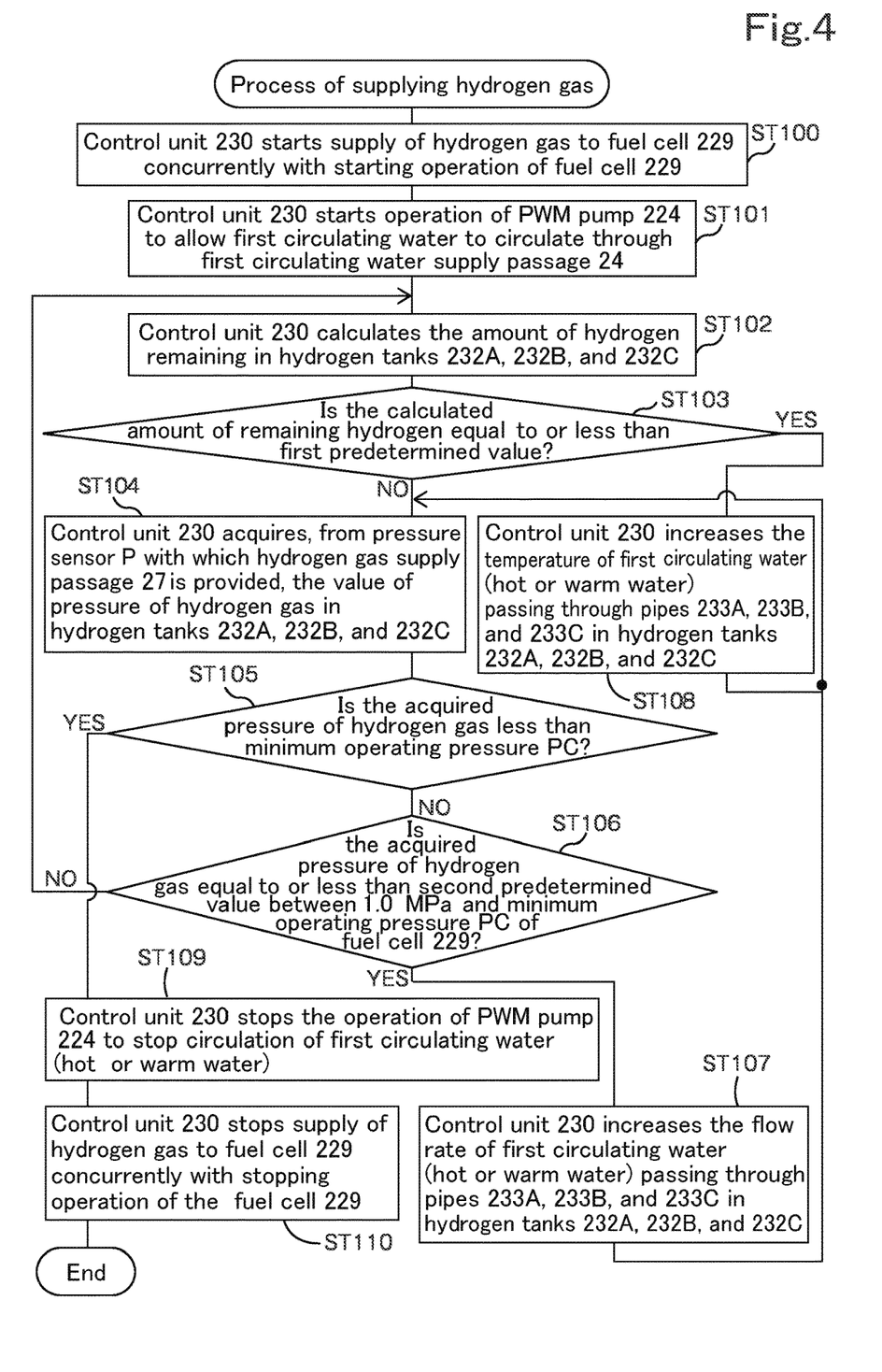
FIG. 4 is a flowchart showing a process of supplying hydrogen gas performed by the fuel cell system in FIG. 2.

FIG. 4 is a flowchart showing the process of supplying hydrogen gas performed by the fuel cell system 22 in FIG. 2.

First, in step ST100 in FIG. 4, the control unit 230 starts the supply of hydrogen gas to the fuel cell 229 concurrently with starting the operation of the fuel cell 229. In the next step ST101, the control unit 230 starts the operation of the PWM pump 224 to allow first circulating water for adjustment of the temperature inside the hydrogen tanks 232A, 232B, and 232C to circulate through the first circulating water supply passage 24. Next, the control unit 230 calculates the amount of hydrogen remaining in the hydrogen tanks 232A, 232B, and 232C (step ST102), and the process proceeds to the next step ST103. In step ST103, the control unit 230 determines whether or not the amount of remaining hydrogen calculated in step ST102 is equal to or less than a first predetermined value VP (see FIGS. 5A(f) and 5B(f) [described later]) and, if the calculated amount of remaining hydrogen is equal to or less than the first predetermined value VP, the process proceeds to step ST108 (described later). If the calculated amount of remaining hydrogen is more than the first predetermined value VP, the process proceeds to the next step ST104.

In step ST104, the control unit 230 acquires, from the pressure sensor P with which the hydrogen gas supply passage 27 is provided, the value of the pressure of hydrogen gas in the hydrogen tanks 232A, 232B, and 232C. In the next step ST105, the control unit 230 determines whether or not the acquired pressure of the hydrogen gas is less than the minimum operating pressure PC. If the acquired pressure of the hydrogen gas is less than the minimum operating pressure PC, the process proceeds to step ST109 (described later). If the acquired pressure of the hydrogen gas is equal to or higher than the minimum operating pressure PC, the process proceeds to the next step ST106.

In step ST106, the control unit 230 determines whether or not the acquired pressure of the hydrogen gas is equal to or less than a second predetermined value PD between 1.0 MPa and the minimum operating pressure PC of the fuel cell 229 (see (b) of FIG. 5A and (b) of FIG. 5B [described later]). If the acquired pressure of the hydrogen gas is equal to or less than the second predetermined value PD, the process proceeds to the next step ST107. If the acquired pressure of the hydrogen gas is higher than the second predetermined value PD, the process returns to the foregoing step ST102. The upper limit "1.0 MPa" of the pressure of hydrogen gas is based on the High Pressure Gas Safety Act stating that the filling pressure of a hydrogen tank must be 1.0 MPa or less.

If the control unit 230 determines that the acquired pressure of hydrogen gas is equal to or less than the second predetermined value PD between 1.0 MPa and the minimum operating pressure PC of the fuel cell 229 in step ST106, the control unit 230 increases the flow rate of first circulating water (hot or warm water) passing through the pipes 233A, 233B, and 233C in the hydrogen tanks 232A, 232B, and 232C to increase the pressure of hydrogen gas in the hydrogen tanks 232A, 232B, and 232C (step ST107). The process then returns to the foregoing step ST104.

In step ST108, the control unit 230 increases the temperature of first circulating water (hot or warm water) passing through the pipes 233A, 233B, and 233C in the hydrogen tanks 232A, 232B, and 232C, and the process returns to the foregoing step ST104. In step ST109, the control unit 230 stops the operation of the PWM pump 224 to stop the circulation of the first circulating water (hot or warm water) and, in the next step ST110, the control unit 230 stops the supply of hydrogen gas to the fuel cell 229 concurrently with stopping the operation of the fuel cell 229. Then, the process ends.

Figure 5A:
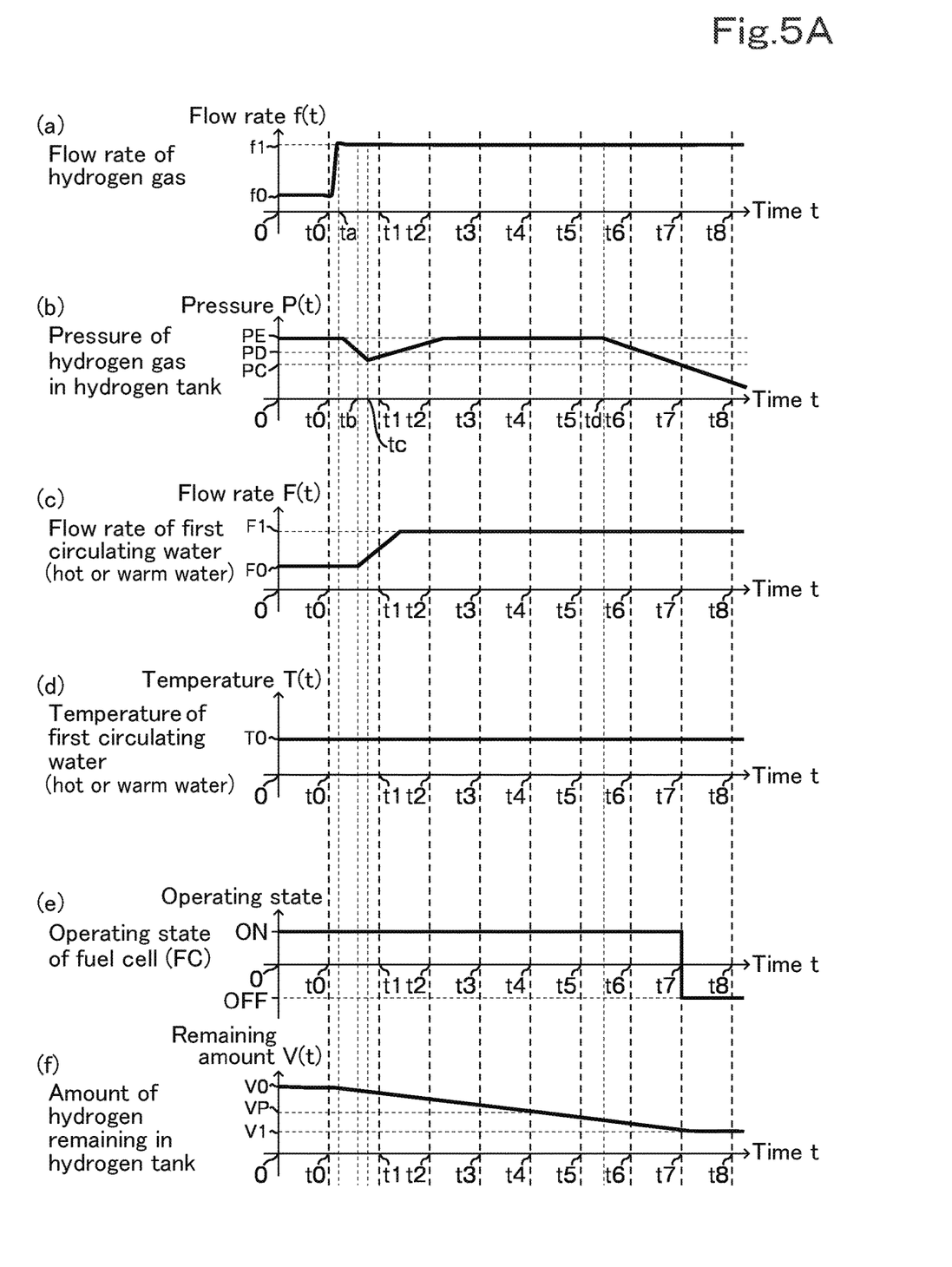
Figure 5B:
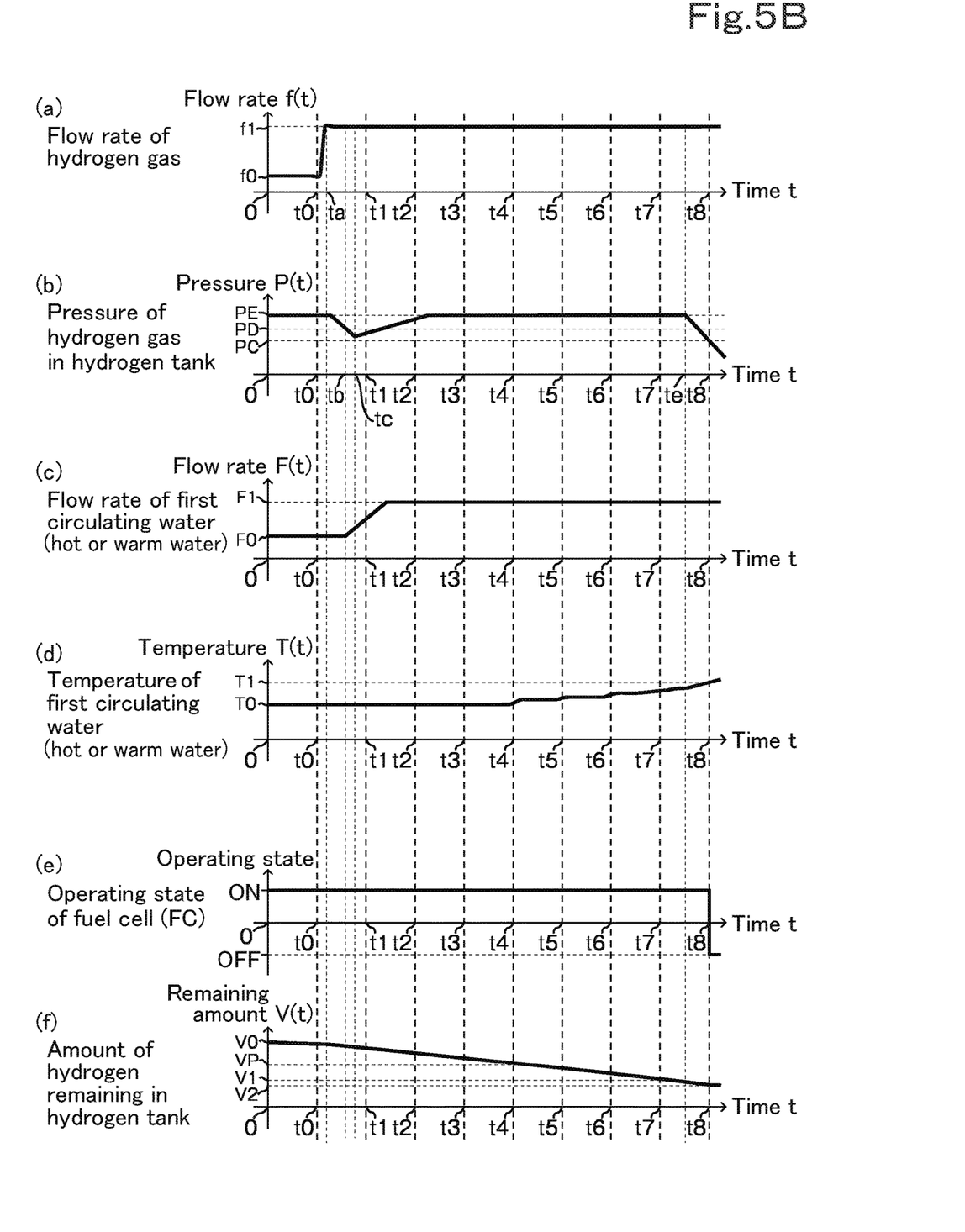

The following description discusses, in detail, effects achieved when the fuel cell system 22 in FIG. 2 performs the steps shown in the flowchart in FIG. 4, with reference to the graphs in FIGS. 5A and 5B.

The effects achieved when the control of the flow rate of first circulating water (hot or warm water) is performed alone are discussed with reference to FIG. 5A. The effects achieved when the control of the temperature of first circulating water (hot or warm water) is performed in addition to the control of the flow rate of first circulating water (hot or warm water) are discussed with reference to FIG. 5B.

(a) of FIG. 5A is a time series waveform chart showing how the flow rate of hydrogen gas flowing from the hydrogen tanks 232A, 232B, and 232C through the hydrogen gas supply passage 27 to the fuel cell 229 changes versus time t. (b) of FIG. 5A is a time series waveform chart showing how the pressure of hydrogen gas in the hydrogen tank 232A in FIG. 2 changes versus time t, and is on the same time axis as (a) of FIG. 5A. (c) of FIG. 5A is a time series waveform chart showing how the flow rate of first circulating water (hot or warm water) flowing in the hydrogen tanks 232A, 232B, and 232C in FIG. 1 changes versus time t, and is on the same time axis as (a) of FIG. 5A. (d) of FIG. 5A is a time series waveform chart showing how the temperature of first circulating water (hot or warm water) changes versus time t, and is on the same time axis as (a) of FIG. 5A. (e) of FIG. 5A is a time series waveform chart showing how the operating state of the fuel cell 229 in FIG. 2 changes versus time t, and is on the same time axis as (a) of FIG. 5A. (f) of FIG. 5A is a time series waveform chart showing how the amount of hydrogen remaining in the hydrogen tank 232A in FIG. 2 changes versus time t, and is on the same time axis as (a) of FIG. 5A.

First, the following description discusses, with reference to (a) of FIG. 5A, an increase in amount of hydrogen gas supplied to the fuel cell 229 resulting from an increase in work load on the working machine. (a) of FIG. 5A shows changes in the flow rate of hydrogen gas flowing from the hydrogen tanks 232A, 232B, and 232C through the hydrogen gas supply passage 27 to the fuel cell 229. (a) of FIG. 5A shows that the flow rate f(t) of hydrogen gas is constant (flow rate f(t) is f0) from time 0 to time t0, whereas the hydrogen gas flow rate f(t) abruptly increases to a flow rate f1 at time ta because of an increase in work load on the working machine at the time t0.

Next, the following description discusses, with reference to (b) of FIG. 5A, a decrease in pressure of hydrogen gas in the hydrogen tanks resulting from an increase in amount of hydrogen gas supplied to the fuel cell 229. (b) of FIG. 5A shows that the hydrogen gas pressure P(t) inside the hydrogen tanks 232A, 232B, and 232C abruptly decreases soon after the time ta because of an abrupt increase in work load on the fuel cell 229. This is because of an abrupt increase in amount of hydrogen gas supplied to the fuel cell 229.

Next, the following description discusses, with reference to (b) and (c) of FIG. 5A, a point in time at which the flow rate of first circulating water (hot or warm water) is increased in response to a decrease in pressure of hydrogen gas in the hydrogen tanks. (b) and (c) of FIG. 5A show that, due to an increase in flow rate of first circulating water (hot or warm water) at time Tb (at which the decreasing hydrogen gas pressure P(t) in the hydrogen tanks 232A, 232B, and 232C reaches the predetermined value PD), the hydrogen gas pressure P(t) in the hydrogen tanks 232A, 232B, and 232C starts increasing at time tc (which comes after time tb) immediately before the hydrogen gas pressure P(t) reaches the minimum operating pressure PC.

(e) of FIG. 5A shows that the operating state of the fuel cell 229 is ON at the time tc. This indicates that, since the hydrogen gas pressure P(t) in the hydrogen tanks is increased and does not decrease directly from the predetermined pressure PD to reach the minimum operating pressure PC or less, it is possible to continue supplying, to the fuel cell 229, hydrogen gas at a pressure equal to or higher than the minimum pressure PC for the fuel cell 229 to operate.

Note that, in FIG. 5A, temperature control to control the pressure of hydrogen gas is not performed, and the control of the flow rate of first circulating water (hot or warm water) is performed alone. Therefore, the temperature of first circulating water (hot or warm water) is controlled at constant temperature (T(t) is T0) (see (d) of FIG. 5A).

The following description discusses, with reference to (b) and (e) of FIG. 5A, a point in time at which the operating state of the fuel cell 229 turns OFF. (b) and (e) of FIG. 5A show that control is performed so that the hydrogen gas pressure P(t) in the hydrogen tanks 232A, 232B, and 232C starts decreasing at time td (td is between time t5 and time t6), and the fuel cell 229 turns OFF at time t7 at which the hydrogen gas pressure P(t) reaches the minimum operating pressure PC (lower limit).

Next, the following description discusses, with reference to (f) of FIG. 5A, the amount of hydrogen remaining in the hydrogen tanks 232A, 232B, and 232C (amount of remaining hydrogen) at the time when the operating state of the fuel cell 229 turns OFF. (f) of FIG. 5A shows that the amount V(t) of hydrogen remaining in the hydrogen tanks 232A, 232B, and 232C is V1 at the time t7 at which the fuel cell 229 turns OFF (see (e) of FIG. 5A).

As described earlier, the control unit 230 acquires the value (data) of the pressure of hydrogen gas in the hydrogen tanks 232A, 232B, and 232C from the pressure sensor P with which the hydrogen gas supply passage 27 is provided, and, if the acquired pressure of hydrogen gas is only slightly above the minimum operating pressure PC of the fuel cell 229 (if the acquired pressure of hydrogen gas is equal to or less than the predetermined PD which is between 1.0 MPa and the minimum operating pressure PC of the fuel cell 229), the control unit 230 controls the flow rate of first circulating water (hot or warm water) passing through the pipes 233A, 233B, and 233C in the hydrogen tanks 232A, 232B, and 232C so that the flow rate increases. This increases the pressure of hydrogen gas in the hydrogen tanks 232A, 232B, and 232C, making it possible to keep the fuel cell 229 in the ON state without allowing the pressure of hydrogen gas to decrease to the minimum operating pressure PC of the fuel cell 229 or lower.

As such, the fuel cell system 22 according to the present embodiment makes it possible, even if the fuel cell 229 is subjected to a sudden electric power load, to supply hydrogen gas in an amount for the fuel cell 229 to output electric power in quick response to the sudden load without causing a decrease in responsiveness.

In FIG. 5A discussed above, the control of the flow rate of first circulating water (hot or warm water) alone is performed. The following description discusses, with reference to FIG. 5B, effects achieved when the control of the temperature of first circulating water (hot or warm water) is performed in addition to the control of the flow rate.

(a) of FIG. 5B is a time series waveform chart showing how the flow rate of hydrogen gas flowing from the hydrogen tanks 232A, 232B, and 232C through the hydrogen gas supply passage 27 to the fuel cell 229 changes versus time t. (b) of FIG. 5B is a time series waveform chart showing how the pressure of hydrogen gas in the hydrogen tank 232A in FIG. 2 changes versus time t, and is on the same time axis as (a) of FIG. 5B. (c) of FIG. 5B is a time series waveform chart showing how the flow rate of first circulating water (hot or warm water) flowing in the hydrogen tanks 232A, 232B, and 232C in FIG. 1 changes versus time t, and is on the same time axis as (a) of FIG. 5B. (d) of FIG. 5B is a time series waveform chart showing how the temperature of first circulating water (hot or warm water) changes versus time t, and is on the same time axis as (a) of FIG. 5B. (e) of FIG. 5B is a time series waveform chart showing how the operating state of the fuel cell 229 in FIG. 2 changes versus time t, and is on the same time axis as (a) of FIG. 5B. (f) of FIG. 5B is a time series waveform chart showing how the amount of hydrogen remaining in the hydrogen tank 232A in FIG. 2 changes versus time t, and is on the same time axis as (a) of FIG. 5B.

The following description discusses the control of the temperature of first circulating water, which is a difference from FIG. 5A. The control of the flow rate of the first circulating water has already been discussed with reference to FIG. 5A, and therefore the descriptions therefor are omitted here.

If the control of the flow rate of first circulating water is performed alone as shown in FIG. 5A, the amount V(t) of hydrogen remaining in the hydrogen tanks 232A, 232B, and 232C is V1 at the time t7 at which the fuel cell 229 stops (see (f) of FIG. 5A).

In contrast, (b) of FIG. 5B shows that, because of a continuous heavy work load on the fuel cell 229, the pressure of hydrogen gas in the hydrogen tanks 232A, 232B, and 232C starts decreasing at time te (time te is between time t7 and time t8) and reaches the minimum operating pressure PC at time t8, and, after the time t8, the pressure of hydrogen gas is less than the minimum operating pressure PC. (e) of FIG. 5B shows that, therefore, the fuel cell 229 changes from ON state to OFF state at the time t8.

Next, the following description discusses, with reference to (f) of FIG. 5B, the amount of hydrogen remaining in the hydrogen tank(s) 232A, 232B, and 232C (the amount of remaining hydrogen) at the time when the operating state of the fuel cell 229 turns OFF. (f) of FIG. 5B shows that the amount V(t) of hydrogen remaining in the hydrogen tanks 232A, 232B, and 232C is V2 (which is less than V1) at the time t8 (time t8 comes after time t7) at which the fuel cell 229 turns OFF (see (e) of FIG. 5B).

This occurs for the following reason. Comparison with the control of the flow rate of first circulating water (hot or warm water) alone (FIG. 5A) shows that the time te (time te is between t7 and time t8) at which the pressure of hydrogen gas in the hydrogen tanks 232A, 232B, and 232C starts decreasing due to a continuous heavy work load on the fuel cell 229 is later than the time td (time td is between time t5 and time t6) at which the pressure of hydrogen gas starts decreasing when the control of the flow rate of first circulating water is performed alone. (d) of FIG. 5B shows that, since the temperature of first circulating water (hot or warm water) is started to increase at time t4 at which the decreasing amount V(t) of hydrogen in the hydrogen tanks 232A, 232B, and 232C reaches the predetermined value VP, hydrogen gas at a pressure equal to or higher than the minimum pressure PC for the fuel cell 229 to operate continues to be supplied to the fuel cell 229 for longer time. At the time t8, the hydrogen gas pressure P(t) in the hydrogen tanks 232A, 232B, and 232C reaches the minimum operating pressure PC, and the fuel cell 229 changes from the ON state to the OFF state (see (e) of FIG. 5B).

As such, when the temperature control is performed in addition to the control of the flow rate of first circulating water, the fuel cell 229 can operate for longer time, making it possible to reduce the amount of hydrogen left absorbed (stored) in the hydrogen storage alloy in the hydrogen tanks 232 (MH tanks).

The fuel cell system 22 according to the present embodiment makes it possible, in the working machine 1 including the fuel cell 229, to increase the temperature in the hydrogen tanks 232A to 232C to increase the amount (flow rate) of supplied hydrogen gas once the pressure of hydrogen gas in the hydrogen tanks has reached a predetermined pressure higher than the minimum pressure of hydrogen gas for the fuel cell 229 to operate, while preventing a rapid drop of the pressure of hydrogen gas to the minimum operating pressure resulting from a rapid increase in electric power load on the fuel cell 229. Thus, since it is possible to increase the amount of supplied hydrogen gas once the pressure of hydrogen gas inside the hydrogen tanks 232A to 232C has reached the predetermined pressure higher than the minimum operating pressure PC of the fuel cell 229 due to a rapid increase in the electric power load on the fuel cell 229 of the working machine 1, it is possible to increase the amount of hydrogen gas supplied to the fuel cell 229 in quick response to an increase in imposed electric power load.

Furthermore, since the control is performed so that hydrogen gas is released by increasing the temperature without reducing the pressure in the hydrogen tanks 232A to 232C (MH tanks) including a hydrogen-storable hydrogen storage alloy, it is possible to allow the fuel cell 229 to operate for longer time and further possible to reduce the amount of hydrogen left unused in the hydrogen storage alloy in the hydrogen tanks 232 (MH tanks).

Although the present embodiment is discussed using the PWM pump 224 to control the flow rate of first circulating water flowing in the temperature controller 220, the present invention is not limited as such. For example, a configuration in which the flow rate of first circulating water flowing in the temperature controller 220 is controlled using a flow control valve instead of the PWM pump 224 may be used. Specifically, the fuel cell system 22 may include, instead of the PWM pump 224, a flow control valve to adjust the flow rate of first circulating water flowing in the first circulating water supply passage 24, and the control unit 230 may be configured to determine the target flow rate of the first circulating water flowing in the first circulating water supply passage 24 based on a difference between a second predetermined value and the pressure of hydrogen gas detected by the pressure sensor P and control the flow control valve to control the flow rate of first circulating water flowing in the first circulating water supply passage 24 at the determined target flow rate. Also in such a case, operations and effects similar to those of the present embodiment can be achieved.

Although the present embodiment is configured such that the amount of hydrogen remaining in the hydrogen tanks 232A, 232B, and 232C is calculated based on the value of electric current from the fuel cell 229, the present invention is not limited as such. For example, the present invention may be configured such that the hydrogen gas supply passage 27 is further provided with a flow rate sensor having the function of detecting the flow rate of hydrogen gas supplied from the hydrogen tanks 232A, 232B, and 232C to the fuel cell 229, and that the control unit 230 adds up the flow rates (detected values) acquired from the flow rate sensor to calculate the amount of consumed hydrogen and calculate the amount of hydrogen remaining in the hydrogen tanks 232A, 232B, and 232C. Also in such a case, operations and effects similar to those of the present embodiment can be achieved.

Although the present embodiment is configured such that the control unit 230 has the function of detecting the value of electric current outputted to a load and the function of detecting the flow rate of hydrogen gas supplied to the fuel cell 229, the present invention is not limited as such. For example, the present invention may include an ammeter to detect the value of electric current outputted to a load, and the control unit 230 may be configured to acquire the detected value as necessary. Also in such a case, operations and effects similar to those of the present embodiment can be achieved.

Although the present embodiment is configured such that the temperature in the hydrogen tanks 232A to 232C is adjusted using only the first circulating water flowing in the first circulating water supply passage 24, the present invention is not limited as such. For example, the present invention may be configured such that the control unit 230 controls the switching positions of the three-way valve 231A to allow second circulating water released from the fuel cell 229 to flow through the first circulating water supply passage 24 so that the temperature in the hydrogen tanks 232A to 232C is adjusted using heat generated by the fuel cell 229. Also in such a case, operations and effects similar to those of the present embodiment can be achieved. In addition, as compared to the present embodiment, the residual heat of the fuel cell 229 is used, and therefore it is possible to reduce the time for which the heater 221 is used and, in turn, possible to reduce power consumption.

Although the present embodiment is configured such that the amount of hydrogen gas supplied to the fuel cell is controlled based on the determination of whether there is an abrupt increase in load electric power based on changes in pressure of hydrogen gas in the hydrogen tanks 232A to 232C, the present invention is not limited as such. For example, the present invention may be configured such that the control unit 230 predicts an abrupt increase in work load based on how a joystick is operated by a user and performs control so that the amount of hydrogen gas supplied to the fuel cell increases. Also in such a case, operations and effects similar to those of the present embodiment can be achieved.

Variations

Figure 6:
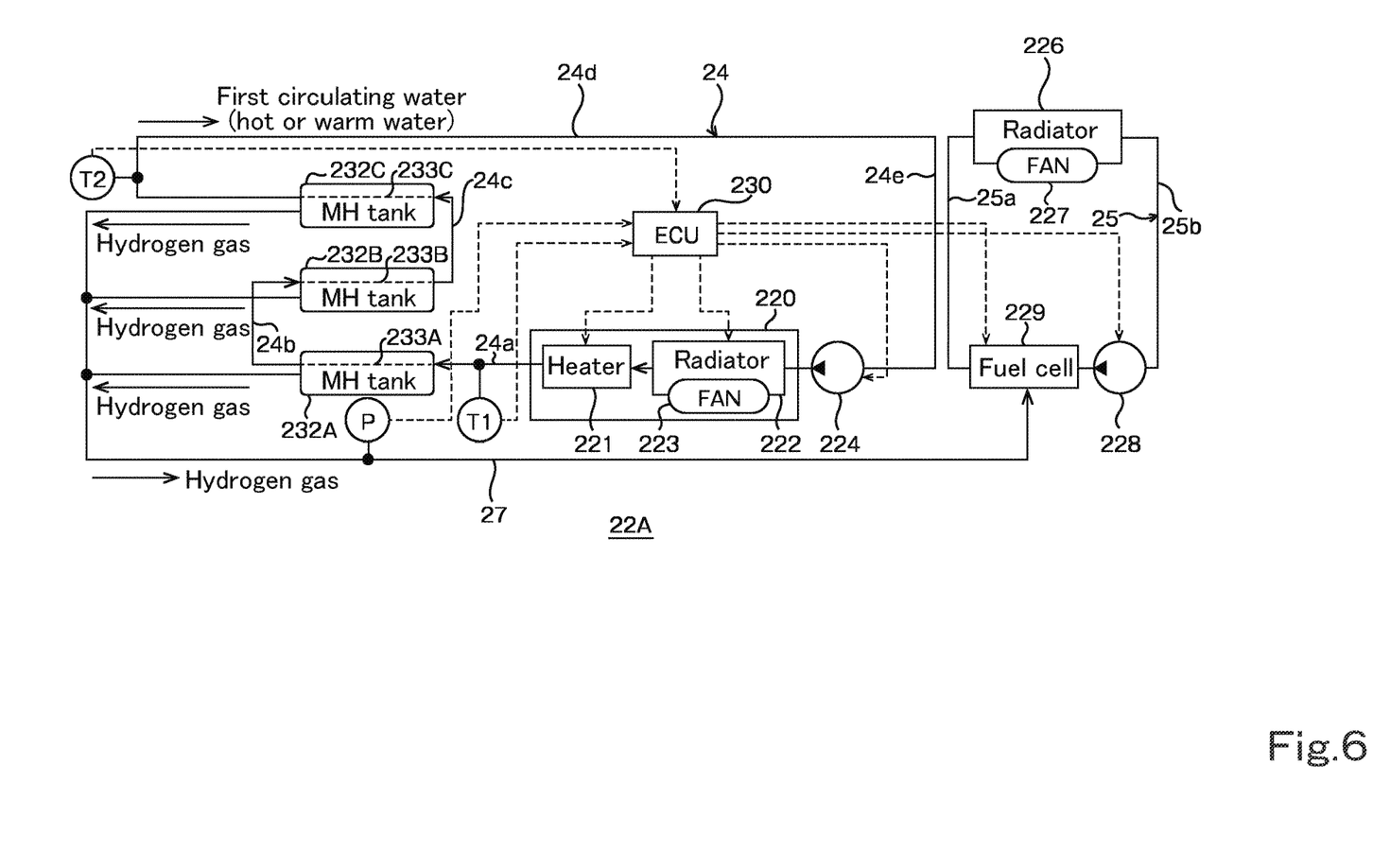
FIG. 6 is a block diagram schematically illustrating a configuration of a fuel cell system according to a variation of the fuel cell system in FIG. 1.

FIG. 6 is a block diagram schematically illustrating a configuration of a fuel cell system 22A according to a variation of the fuel cell system 22 in FIG. 1. The fuel cell system 22A in FIG. 6 differs from the fuel cell system 22 in FIG. 1 in that the first circulating water supply passage 24 for circulation of first circulating water to adjust the temperature in each of the hydrogen tanks 232A to 232C and the second circulating water supply passage 25 for circulation of second circulating water (cooling water) to cool the fuel cell 229 are provided separately from each other. Specifically, in the fuel cell system 22 in FIG. 1, the same passage serves both as the fifth flow passage 24e of the first circulating water supply passage 24 and the eighth flow passage 25a of the second circulating water supply passage 25, and the switching positions of the three-way valve 231A and the three-way valve 231B are changed so that the first circulating water (hot or warm water) and the second circulating water (cooling water) circulate through the first circulating water supply passage 24 and the second circulating water supply passage 25, respectively.

In contrast, in the fuel cell system 22A in FIG. 6, since the fifth flow passage 24*e* of the first circulating water supply passage 24 and the eighth flow passage 25*a* of the second circulating water supply passage 25 are provided separately from each other, the fuel cell system 22A does not need to include the three-way valve 231A or the three-way valve 231B. Also in such a case, effects similar to those of the foregoing embodiment can be achieved. Furthermore, since it is not necessary to control the respective flows of the first circulating water and the second circulating water using the three-way valves 231A and 231B unlike the fuel cell system 22 in FIG. 1 according to the foregoing embodiment, i.e., since the control to raise the temperature in the hydrogen tank(s) and the control to cool the fuel cell 229 are performed separately compared to the fuel cell system 22 according to the foregoing embodiment, controlling is easier than the fuel cell system 22 according to the foregoing embodiment.

As has been described, a fuel cell system 22 according to a first aspect includes a hydrogen tank 232 to store hydrogen, and a fuel cell 229 to receive hydrogen gas from the hydrogen tank 232 to generate electricity, a temperature controller 220 to adjust a temperature inside the hydrogen tank 232, and a control unit 230 to control the temperature controller 220 based on the amount of hydrogen remaining in the hydrogen tank 232, the control unit 230 being configured to increase the temperature inside the hydrogen tank 232 when the amount of the remaining hydrogen is equal to or less than a first predetermined value.

With the configuration, it is possible to quickly control the temperature controller 220 based on the amount of hydrogen remaining in the hydrogen tank 232, and thus possible to adjust the temperature inside the hydrogen tank 232 immediately after the amount of hydrogen remaining in the hydrogen tank 232 reaches the first predetermined value or less. This makes it possible, even if, in the working machine 1 including the fuel cell 229, the fuel cell 229 is subjected to a sudden electric power load, to quickly increase the amount of hydrogen gas outputted from the hydrogen tank 232 to the fuel cell 229 by quickly adjusting the temperature inside the hydrogen tank 232 using the temperature controller 220. Thus, it is possible to supply hydrogen gas in an amount for the fuel cell 229 to output electric power, in quick response to the sudden load without causing a decrease in responsiveness.

At least one of the following features (a) to (o) may be included in addition to the fuel cell system 22 according to the first aspect.
- (a) The fuel cell system 22 may further include a first circulating water supply passage 24 for circulation of first circulating water to adjust the temperature inside the hydrogen tank 232.
- (b) The temperature controller 220 may include a heater 221 to increase a temperature of the first circulating water, the first circulating water supply passage 24 being provided with the heater 221, and the control unit 230 may be configured to, when the amount of the remaining hydrogen is equal to or less than the first predetermined value, start energizing the heater 221 to increase the temperature inside the hydrogen tank 232.

With the configuration, it is possible to instantly increase the temperature of first circulating water which adjusts the temperature inside the hydrogen tank 232 using the heater 221. This makes it possible to instantly increase the temperature inside the hydrogen tank 232 using the heater 221 when the amount of remaining hydrogen is equal to or less than the first predetermined value, and thus possible to supply, in quicker response to a sudden load, hydrogen gas in an amount for the fuel cell 229 to output electric power. It is also possible to reduce the amount of hydrogen left unused in the hydrogen tank 232.
- (c) The temperature controller 220 may further include a first radiator 222 to reduce the temperature of the first circulating water, the first circulating water supply passage 24 being provided with the first radiator 222, and a first blower 223 to pass cooling air across the first radiator 222.

With the configuration, since the first radiator 222 to reduce the temperature of first circulating water is further included, it is possible to control the temperature inside the hydrogen tank 232 without causing an excessive increase in temperature inside the hydrogen tank 232. Thus, it is possible to prevent or reduce the likelihood that hydrogen gas is supplied to the fuel cell 229 in an amount more than necessary for the fuel cell 229 to output electric power.
- (d) The fuel cell system 22 may further include a second circulating water supply passage 25 for circulation of second circulating water to cool the fuel cell 229, and the first circulating water supply passage 24 may branch from the second circulating water supply passage 25.

With the configuration, since it is possible to cool the fuel cell 229 using the second circulating water, it is possible to prevent or reduce the likelihood that the fuel cell 229 will become hot due to heat generated thereby.
- (e) The fuel cell system 22 may further include a second radiator 226 to reduce a temperature of the second circulating water, the second circulating water supply passage 25 being provided with the second radiator 226, and a second blower 227 to pass cooling air across the second radiator 226.

With the configuration, since the second radiator 226 to reduce the temperature of the second circulating water which cools the fuel cell 229 is further included, it is possible to maintain the efficiency of cooling the fuel cell 229 for long time.
- (f) The control unit 230 may calculate a target temperature from the calculated amount of the remaining hydrogen based on a characteristics map of temperature versus the amount of the remaining hydrogen, and control the heater 221 to control an actual temperature of the first circulating water flowing in the first circulating water supply passage 24 at the target temperature thus calculated.

With the configuration, since the target temperature of first circulating water is determined using a characteristics map of temperature versus the amount of remaining hydrogen, it is possible to quickly calculate the target temperature of the first circulating water. Furthermore, when the characteristics map data needs to be changed according to the type of working machine 1, the characteristics map data can be changed easily.
- (g) The fuel cell system 22 may further include a hydrogen gas supply passage 27 for supply of the hydrogen gas from the hydrogen tank 232 to the fuel cell 229.

(h) The hydrogen gas supply passage 27 may be provided with a pressure sensor P to detect a pressure of the hydrogen gas in the hydrogen tank 232.

The configuration makes it possible to detect the amount of hydrogen remaining in the hydrogen tank 232 merely by detecting the pressure of hydrogen gas immediately before being inputted into the fuel cell 229.

(i) The fuel cell system 22 may further include a flow control valve to adjust a flow rate of the first circulating water flowing in the first circulating water supply passage 24, and the control unit 230 may determine a target flow rate of the first circulating water flowing in the first circulating water supply passage 24 based on a difference between a second predetermined value and the pressure of the hydrogen gas detected by the pressure sensor P, and control the flow control valve to control the flow rate of the first circulating water flowing in the first circulating water supply passage 24 at the target flow rate thus determined.

With the configuration, it is possible to determine the target flow rate of first circulating water based on the difference between the second predetermined value and the pressure of hydrogen gas detected by the pressure sensor P. This makes it possible to easily determine the target flow rate of first circulating water.

(j) The fuel cell system 22 may further include a pulse width modulation (PWM) pump 224 to adjust a flow rate of the first circulating water flowing in the first circulating water supply passage 24, and the control unit 230 may determine a target flow rate of the first circulating water flowing in the first circulating water supply passage 24 based on a difference between a second predetermined value and the pressure of the hydrogen gas detected by the pressure sensor P, and control the PWM pump 224 to control the flow rate of the first circulating water flowing in the water supply passage 24 at the target flow rate thus determined.

With the configuration, it is possible to determine the target flow rate of first circulating water based on the difference between the second predetermined value and the pressure of hydrogen gas detected by the pressure sensor P. This makes it possible to easily determine the target flow rate of first circulating water.

(k) The second predetermined value may be between a minimum pressure of the hydrogen gas for the fuel cell 229 to operate and 1.0 MPa.

With the configuration, the pressure of hydrogen gas supplied to the fuel cell 229 is controlled to be less than 1.0 MPa. This ensures safety.

(l) The minimum pressure of the hydrogen gas for the fuel cell 229 to operate may be 0.85 MPa.

(m) The control unit 230 may stop the fuel cell 229 from generating electricity when the pressure of the hydrogen gas detected by the pressure sensor P is less than a minimum pressure of the hydrogen gas for the fuel cell 229 to operate.

With the configuration, the fuel cell 229 is stopped from generating electricity when the pressure of hydrogen gas detected by the pressure sensor P is less than the minimum operating pressure of the fuel cell 229. This makes it possible to prevent or reduce the unnecessary electricity generation by the fuel cell 229.

(n) The hydrogen tank 232 may include a hydrogen storage alloy, and is configured to allow the hydrogen gas to be released from the hydrogen storage alloy and supply the hydrogen gas to the fuel cell 229.

The configuration makes it possible to store (absorb) a large amount of hydrogen at low temperature.

(o) The control unit 230 may calculate the amount of the remaining hydrogen based on a flow rate of the hydrogen gas or a value of electric current from the fuel cell 229.

The configuration makes it possible to easily calculate the amount of hydrogen remaining in the hydrogen tank 232.

A working machine 1 according to a second aspect includes the fuel cell system 22 according to the first aspect.

A method of controlling a fuel cell system 22 according to a third aspect is a method of controlling a fuel cell system 22 which includes a hydrogen tank 232 to store hydrogen and a fuel cell 229 to receive hydrogen gas from the hydrogen tank 232 to generate electricity, the method including a) circulating first circulating water through a first circulating water supply passage 24, the first circulating water being water to adjust a temperature inside the hydrogen tank 232, b) increasing a temperature of the first circulating water flowing in the first circulating water supply passage 24, and c) increasing the temperature of the first circulating water based on the amount of the hydrogen remaining in the hydrogen tank 232, wherein the step c) includes calculating the amount of the hydrogen remaining in the hydrogen tank 232 and increasing the temperature of the first circulating water when the amount of the remaining hydrogen thus calculated is equal to or less than a first predetermined value.

With the configuration, it is possible to quickly control the temperature controller 220 based on the amount of hydrogen remaining in the hydrogen tank 232, and thus possible to adjust the temperature inside the hydrogen tank 232 immediately after the amount of hydrogen remaining in the hydrogen tank 232 reaches the first predetermined value or less. This makes it possible, even if, in the working machine 1 including the fuel cell 229, the fuel cell 229 is subjected to an abrupt electric power load, to quickly increase the amount of hydrogen gas outputted from the hydrogen tank 232 to the fuel cell 229 by quickly adjusting the temperature inside the hydrogen tank 232 using the temperature controller 220. Thus, it is possible to supply hydrogen gas in an amount for the fuel cell 229 to output electric power, in quick response to the sudden load without causing a decrease in responsiveness.

At least one of the following features (p) to (t) may be included in addition to the method of controlling a fuel cell system 22 according to the third aspect.

(p) The amount of the remaining hydrogen may be calculated based on a flow rate of the hydrogen gas or a value of electric current from the fuel cell 229.

The configuration makes it possible to easily calculate the amount of hydrogen remaining in the hydrogen tank 232.

(q) A target temperature may be calculated, based on a characteristics map of temperature versus the amount of the remaining hydrogen, from the amount of the remaining hydrogen thus calculated, and the temperature of the first circulating water flowing in the first circulating water supply passage 24 may be increased to the target temperature thus calculated.

With the configuration, since the target temperature of first circulating water is determined using a characteristics map of temperature versus the amount of remaining hydrogen, it is possible to quickly calculate the target temperature of the first circulating water. Furthermore, when the characteristics map data needs to be changed according to the type of working machine 1, the characteristics map data can be changed easily.

(r) The method may further include d) adjusting a flow rate of the first circulating water flowing in the first circulating water supply passage 24, e) detecting a pressure of the hydrogen gas in the hydrogen tank 232, and f) determining a target flow rate of the first circulating water flowing in the first circulating water supply passage 24 based on a difference between a second predetermined value and the pressure of the hydrogen gas detected by the pressure sensor P, and controlling the flow rate of the first circulating water flowing in the first circulating water supply passage 24 at the target flow rate thus determined.

With the configuration, it is possible to determine the target flow rate of first circulating water based on the difference between the second predetermined value and the pressure of hydrogen gas detected by the pressure sensor P. This makes it possible to easily determine the target flow rate of first circulating water.

(s) The second predetermined value may be between a minimum pressure of the hydrogen gas for the fuel cell 229 to operate and 1.0 MPa.

With the configuration, the pressure of hydrogen gas supplied to the fuel cell 229 is controlled to be less than 1.0 MPa. This ensures safety.

(t) The minimum pressure of the hydrogen gas for the fuel cell 229 to operate may be 0.85 MPa.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A fuel cell system comprising:
hydrogen tanks to store hydrogen;
a fuel cell to receive hydrogen gas from at least one of the hydrogen tanks to generate electricity;
a temperature controller to adjust a temperature inside the at least one of the hydrogen tanks;
a control unit to control the temperature controller based on the amount of hydrogen remaining in the at least one of the hydrogen tanks, the control unit being configured to increase the temperature inside the at least one of the hydrogen tanks when the amount of the remaining hydrogen is equal to or less than a first predetermined value;
a hydrogen gas supply passage for supply of the hydrogen gas from the at least one of the hydrogen tanks to the fuel cell; and
a first circulating water supply passage to allow first circulating water to circulate therein to adjust a temperature of the hydrogen, the first circulating water supply passage being attached to the at least one of the hydrogen tanks,
wherein the first circulating water supply passage is a circulation passage which passes from the temperature controller through the hydrogen tanks and returns to the temperature controller.

2. The fuel cell system according to claim 1, wherein the temperature controller includes:
a first radiator to reduce the temperature of the first circulating water, the first circulating water supply passage being provided with the first radiator; and
a first blower to pass cooling air across the first radiator.

3. The fuel cell system according to claim 1, further comprising:
a second circulating water supply passage for circulation of second circulating water to cool the fuel cell, wherein
the first circulating water supply passage branches from the second circulating water supply passage.

4. The fuel cell system according to claim 3, further comprising:
a second radiator to reduce a temperature of the second circulating water, the second circulating water supply passage being provided with the second radiator; and
a second blower to pass cooling air across the second radiator.

5. The fuel cell system according to claim 1, wherein the control unit
calculates a target temperature from the calculated amount of the remaining hydrogen based on a characteristics map of temperature versus the amount of the remaining hydrogen, and
controls a heater to control an actual temperature of the first circulating water flowing in the first circulating water supply passage at the target temperature thus calculated.

6. The fuel cell system according to claim 1, wherein
the hydrogen gas supply passage is provided with a pressure sensor to detect a pressure of the hydrogen gas in the at least one of the hydrogen tanks.

7. The fuel cell system according to claim 6, further comprising:
a flow control valve to adjust a flow rate of the first circulating water flowing in the first circulating water supply passage, wherein
the control unit
determines a target flow rate of the first circulating water flowing in the first circulating water supply passage based on a difference between a second predetermined value and the pressure of the hydrogen gas detected by the pressure sensor, and
controls the flow control valve to control the flow rate of the first circulating water flowing in the first circulating water supply passage at the target flow rate thus determined.

8. The fuel cell system according to claim 6, further comprising:
a pulse width modulation (PWM) pump to adjust a flow rate of the first circulating water flowing in the first circulating water supply passage, wherein
the control unit
determines a target flow rate of the first circulating water flowing in the first circulating water supply passage based on a difference between a second predetermined value and the pressure of the hydrogen gas detected by the pressure sensor, and
controls the PWM pump to control the flow rate of the first circulating water flowing in the first circulating water supply passage at the target flow rate thus determined.

9. The fuel cell system according to claim 6, wherein the control unit stops the fuel cell from generating electricity when the pressure of the hydrogen gas detected by the pressure sensor is less than a minimum pressure of the hydrogen gas for the fuel cell to operate.

10. The fuel cell system according to claim 1, wherein the at least one of the hydrogen tanks includes a hydrogen storage alloy, and is configured to allow the hydrogen gas to be released from the hydrogen storage alloy and supply the hydrogen gas to the fuel cell.

11. The fuel cell system according to claim 1, wherein the control unit calculates the amount of the remaining hydrogen based on a flow rate of the hydrogen gas or a value of electric current from the fuel cell.

12. A working machine comprising the fuel cell system according to claim 1.

13. The fuel cell system according to claim 1, wherein the first circulating water supply passage is attached to the hydrogen tanks.

14. The fuel cell system according to claim 1, wherein
   the first circulating water supply passage includes a flow passage for passage of the first circulating water, the flow passage including a pipe in the at least one of the hydrogen tanks, and
   the control unit is configured to, when the amount of the remaining hydrogen is equal to or less than the first predetermined value, start energizing a heater to increase the temperature inside the at least one of the hydrogen tanks.

* * * * *